(12) United States Patent
Maistre et al.

(10) Patent No.: US 11,828,341 B2
(45) Date of Patent: Nov. 28, 2023

(54) BRAKE PAD WITH PARTICLE AND DUST COLLECTION

(71) Applicant: TALLANO TECHNOLOGIE, Boulogne Billancourt (FR)

(72) Inventors: Adrien Maistre, Boulogne Billancourt (FR); Thibaut Le Boulaire, Boulogne Billancourt (FR); Loïc Adamczak, Boulogne Billancourt (FR)

(73) Assignee: TALLANO TECHNOLOGIE, Boulogne Billancourt (FR)

( * ) Notice: Subject to any disclaimer, the term of this patent is extended or adjusted under 35 U.S.C. 154(b) by 311 days.

(21) Appl. No.: 17/284,344

(22) PCT Filed: Oct. 11, 2019

(86) PCT No.: PCT/FR2019/052420
§ 371 (c)(1),
(2) Date: Apr. 9, 2021

(87) PCT Pub. No.: WO2020/074841
PCT Pub. Date: Apr. 16, 2020

(65) Prior Publication Data
US 2021/0356005 A1 Nov. 18, 2021

(30) Foreign Application Priority Data

Oct. 12, 2018 (FR) ...................... 18 59497

(51) Int. Cl.
*F16D 65/00* (2006.01)
*F16D 65/092* (2006.01)
(52) U.S. Cl.
CPC ....... *F16D 65/0031* (2013.01); *F16D 65/092* (2013.01)
(58) Field of Classification Search
CPC ........................... F16D 65/0031; F16D 65/092
See application file for complete search history.

(56) References Cited

U.S. PATENT DOCUMENTS

| 3,190,397 A | * | 6/1965 | Pierre | ................. B29C 33/0044 |
| | | | | 188/1.11 R |
| 2014/0116824 A1 | * | 5/2014 | Jakubowski | ........ F16D 65/0031 |
| | | | | 188/251 R |

(Continued)

FOREIGN PATENT DOCUMENTS

| DE | 1 263 526 B | 3/1968 |
| FR | 3 057 040 | 4/2018 |

(Continued)

OTHER PUBLICATIONS

International Search Report for PCT/FR2019/052420 dated Feb. 10, 2020, 5 pages.

(Continued)

*Primary Examiner* — Pamela Rodriguez
(74) *Attorney, Agent, or Firm* — NIXON & VANDERHYE

(57) ABSTRACT

A brake pad includes a sole plate with outer and inner faces, and a lining made of friction material fixed to the inner face, the lining being delimited by friction and attachment faces, and inner, outer, rear, and front edges. The lining has a collection groove open on the friction face near the rear edge, the sole plate including a suction hole in fluid communication with the collection groove, this hole being connected to a negative pressure source. The collection groove is extended, at an end, by a duct of which the outer end is open away from the friction face, via an inlet, and of which the inner end is open in the collection groove via an outlet forming a cross-sectional jump with the groove. During operation, a negative pressure exists between the inlet and the collection groove one on each side of the duct.

8 Claims, 6 Drawing Sheets

(56) References Cited

U.S. PATENT DOCUMENTS

2015/0001013 A1* 1/2015 Mennie ............... B60T 5/00
                                                188/73.1
2020/0340541 A1* 10/2020 Adamczak ............ F16D 55/22

FOREIGN PATENT DOCUMENTS

| FR | 3071573 A1 | 3/2019 |
| GB | 1025881 A | 4/1966 |
| GB | 2540361 | 1/2017 |
| JP | 2007-192268 A | 8/2007 |
| JP | 2015500448 A | 1/2015 |
| JP | 2017082969 A | 5/2017 |

OTHER PUBLICATIONS

Written Opinion of the ISA for PCT/FR2019/052420 dated Feb. 10, 2020, 6 pages.
Office Action issued in Russian Patent Application No. 2021113302, dated Oct. 27, 2022.
Office Action issued in Japanese Patent Application No. 2021-519570 dated Sep. 4, 2023.

* cited by examiner

BRAKE PAD WITH PARTICLE AND DUST COLLECTION

CROSS-REFERENCE TO RELATED APPLICATIONS

This application is the U.S. national phase of International Application No. PCT/FR2019/052420 filed Oct. 11, 2019 which designated the U.S. and claims priority to FR 18 59497 filed Oct. 12, 2018, the entire contents of each of which are hereby incorporated by reference.

BACKGROUND OF THE INVENTION

Field of the Invention

The invention relates to non-polluting braking systems intended for use in machines comprising a rotating element whose rotation is to be slowed down, for example such as road vehicles, rail vehicles, wind turbines.

Description of the Related Art

In such brake systems, friction braking emits particles and dust which result from abrasion of the brake pads against the rotating member. This rotating member is for example the wheel of the vehicle, or a disc driven by the wheel of the vehicle. It is known that these particles released into the ambient environment are harmful to human health. In addition, improvements in electric motorization for motor vehicles have increased the need to treat the particles and dust resulting from the abrasion of friction braking systems.

There is therefore a need to capture these particles and dust before they are released into the ambient environment.

Thus, document FR 3 057 040 is known which describes a brake pad 10 in a disc brake, the pad comprising a sole plate 1 and a lining 2 made of friction material, the lining being delimited by a friction face 26, an attachment face 20, an inner edge 23, an outer edge 24, a rear edge 21, a front edge 22. The lining 2 is provided with a collection groove 3 which is open on the friction face 26 and which is located near the rear edge 21, the sole plate 1 comprising a suction hole 17 in fluid communication with the collection groove 3. The suction hole 17 is connected to a negative pressure source via communication means (not shown). The collection groove 3 extends to the inner edge 23 and is open thereon in the form of a slot 33.

Such a brake pad is illustrated in FIGS. 12 and 13, and represents the prior art.

This pad has disadvantages, however.

Indeed, the inventors have found that there is a decrease in suction performance as the lining wears. In fact, wear leads to a linear increase in pressure drops, pressure drops which force the turbine to reduce its flow. This results in a reduction in the performance of particle and dust capture by the collection groove, and therefore a greater release of these particles and dust into the atmosphere, which is undesirable.

SUMMARY OF THE INVENTION

The present invention aims to remedy these disadvantages.

The invention relates to a brake pad comprising a sole plate with an outer face and an inner face, and a lining made of friction material fixed to the inner face, the lining being delimited by a friction face, an attachment face, an inner edge, an outer edge, a rear edge, and a front edge, the lining being provided with at least one collection groove that is open on the friction face and is located at least in part near the rear edge, the sole plate comprising at least one suction hole in fluid communication with the at least one collection groove, the at least one suction hole being connected to a negative pressure source via communication means.

The invention aims to provide a brake pad provided with a collection groove, for which the suction performance remains substantially constant as the lining of the pad wears.

This object is achieved by virtue of the fact that the collection groove is extended, at at least one of its ends, by a duct of which the outer end is open away from the friction face, via an inlet, and of which the inner end is open in at least one collection groove via an outlet which forms a cross-sectional jump with at least one groove such that, during operation, a negative pressure exists between the inlet of the duct and at least one collection groove one on each side of the duct.

With these arrangements, the suction performance by the collection groove remains substantially constant, in other words has little variation as the lining of the pad wears, as has been shown in the tests carried out by the inventors.

Advantageously, the outer end is open at least in the vicinity of one of the edges.

For example, the outer end is open in the region of the at least one of the edges which is closest to the sole plate and which is not consumed at the end of the normal operating life of the pad.

The cross-sectional area of the duct thus remains constant throughout the life of the pad.

Advantageously, the duct passes through the sole plate, the outer end opening onto the outer face of the sole plate.

The manufacture of the pad is thus simplified.

Advantageously, the collection groove consists of a single groove which runs along the rear edge.

Advantageously, the collection groove also runs along the front edge.

The collection of particles and dust is thus achievable in both directions of movement of the vehicle.

Advantageously, the collection groove is C-shaped or E-shaped and runs along the outer edge or the inner edge.

The collection of particles and dust is thus more efficient.

Advantageously, the at least one collection groove consists of a plurality of separate grooves including a first groove which runs along the rear edge.

The collection of particles and dust is thus more efficient.

For example, the plurality of grooves is two in number.

Advantageously, one of the at least one duct extends between one end of one groove and one end of another groove among the plurality of grooves.

The collection of particles and dust is thus more efficient.

BRIEF DESCRIPTION OF THE DRAWINGS

The invention will be well understood and its advantages will be more apparent from reading the following detailed description of an embodiment shown as a non-limiting example. The description refers to the accompanying drawings, in which.

DESCRIPTION OF THE PREFERRED EMBODIMENTS

Figure 1:
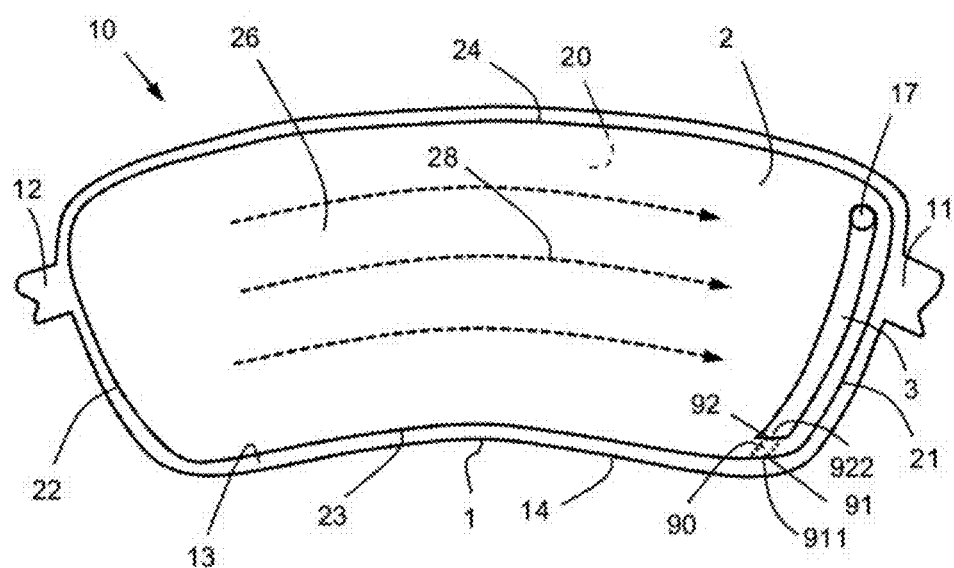
FIG. 1 is a top view of a brake pad according to the invention.

The invention relates to a brake pad 10 of a brake in the braking device of a rotating element 9 of a machine. The invention is described below for the case where the machine is a road vehicle in which this brake is a disc brake. However, the invention applies equally well to the case of a brake pad in a brake shoe which rubs on a wheel, used in vehicles on rails (trains), or in the case of a brake pad used in any other industrial machine (for example in the case of a wind turbine). In all cases, the braking of a rotating element of the machine is achieved by friction of the brake pad on this rotating element during its rotation.

In a disc brake, braking occurs by friction between a disc (which is the rotating element 9) which is integral with a wheel of the vehicle, and two brake pads 10 which press against this disc 9, one on each side, in order to sandwich it. The disc 9 extends in a main plane and has as its axis of rotation an axis A which is perpendicular to this main plane.

Each of the pads 10 extends within this main plane, such that the thickness of a pad 10 extends along the axis of rotation A.

The disc 9 rotates about the axis of rotation A in a rotation direction FW, which defines a tangential direction T which is tangent to the circumference of the disc 9 and oriented in the rotation direction FW, and a radial direction R orthogonal to the axis of rotation A in the main plane of the disc 9.

Figure 5:
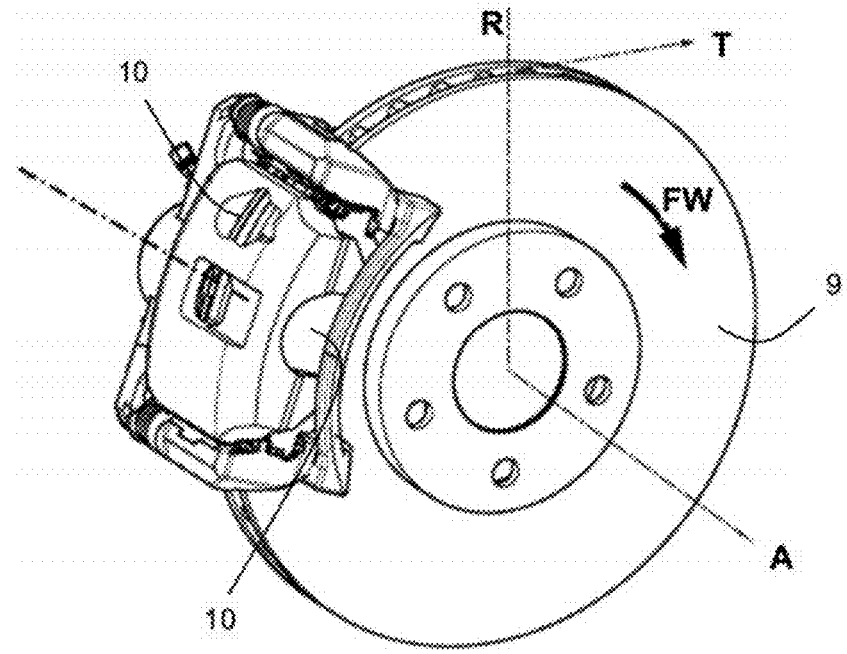
FIG. 5 is a perspective view of a braking system comprising a brake pad according to the invention.

These elements are indicated in FIG. 5, which shows the braking device mounted on the disc 9.

In the description which follows, the terms "inner" and "outer" denote the edges or areas of the brake pad 10 (or of its components) which are located respectively closest to and furthest from the axis of rotation A, and the terms "front" and "rear" denote the edges or areas of the brake pad 10 (or of its components) which are located respectively upstream and downstream relative to the direction of circulation of the particles 28 emitted by the lining 2 (described below), which is also the rotation direction FW.

Figure 2:
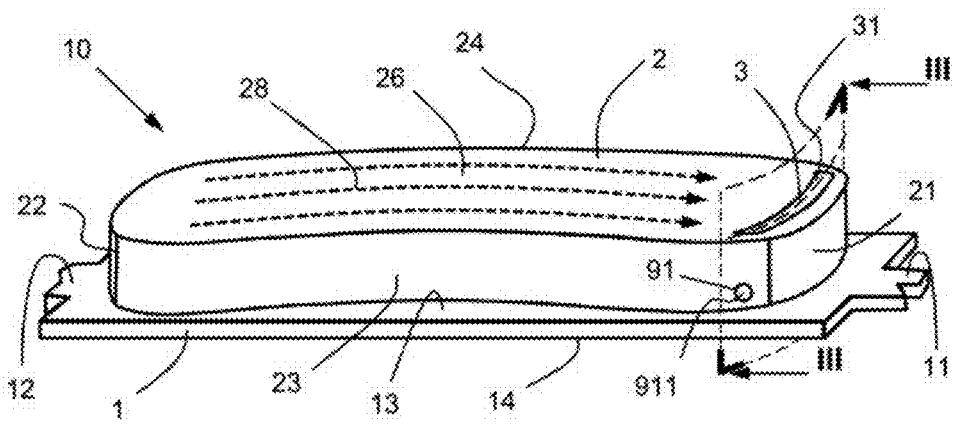
FIG. 2 is a perspective view of a brake pad according to the invention.

As illustrated in FIGS. 1 and 2, a brake pad 10 comprises a sole plate 1, also called a base. The sole plate 1 is for example made of metal. The sole plate 1 is a flat plate of substantially constant thickness (for example between 3 and 5 mm), its general shape within its main plane being trapezoidal with straight or curved edges.

The sole plate 1 comprises a first face 13 on which a lining 2 is fixed, and a second face 14 which is opposite to the first face 13.

The sole plate 1 also comprises two tangs (11, 12), which extend within the plane of the sole plate 1 at two lateral ends of the plate, and which serve to hold and guide the pad 10.

The brake pad 10 further comprises a lining 2 made of a friction material. For example, this material is a material referred to as "ferodo".

The lining 2 is delimited by a friction face 26 ("rubbing" face), an attachment face 20 opposite to the friction face 26, these two faces being parallel) and fixed on the sole plate 1, an inner edge 23, a outer edge 24, a rear edge 21, and a front edge 22. The outer 24, rear 21, and front 22 edges are convex or straight; the inner edge 23 is concave or straight.

The friction face 26 gradually approaches the sole plate 1 as the lining 2 wears. The thickness of the lining 2 (measured along the axis of rotation A) therefore decreases with its wear.

During operation, the lining 2 (and the rotating member 9) releases particles 28 because of the friction between the lining 2 and the disc 9. The paths of the particles 28 along the friction face 26 are represented by dotted lines in FIGS. 1 and 2.

The lining 2 is provided with at least one collection groove 3 that is open on the friction face 26 and is located near the rear edge 21.

For example, the surface area of the portion of the friction face 26 which is located between the rear edge 21 and the groove 3 is less than 10% of the total surface area of the friction face 26.

The depth of the groove or grooves 3 is equal to the height of the lining 2, in other words the bottom of the groove or grooves 3 is coincident with the first face 13 of the sole plate 1.

The collection groove 3, or at least one of the collection grooves 3, extends at least partially along the rear edge 21, and is straight or follows the curvature of the rear edge 21. The smallest dimension of the groove 3 is its thickness, measured in the main plane of the pad 10, substantially in the tangential direction T.

For example, the collection groove or grooves 3 has a constant rectangular cross-section from its upstream end to its downstream end, and is therefore of constant thickness.

The lining 2 is for example provided with a single continuous groove, substantially straight or having one or more elbows between two or more substantially straight portions.

Alternatively, the lining 2 is provided with a plurality of collection grooves 3 which are separate from each other. Separate grooves is understood to mean that the grooves do not communicate with each other, other than possibly via a duct 90, as described below.

Thus, in the invention, either the lining 2 has a single collection groove 3 (unique groove), or the lining 2 has a plurality of separate collection grooves 3.

In summary, according to the invention, the lining 2 is provided with (presents) at least one collection groove 3, and this at least one collection groove 3 either consists of a single groove, of which at least a portion runs along the rear edge 21, or consists of a plurality of separate grooves including a first groove 3a which runs along the rear edge 21.

In the case of a single collection groove 3, this groove comprises a single straight or curvilinear portion, or several straight or curvilinear portions connected by elbows to form a network of portions of joined grooves. The collection groove 3 is then connected.

An air flow is created in the collection groove or grooves 3, this air flow 10 being generated by a negative pressure source (suction system), as described below.

In the part of the description below referring to FIGS. 1 to 4, it describes the case where there is a single collection groove 3, extended at one of its ends by a duct 90 (see below) which is open in the vicinity of the inner edge 23. The invention applies similarly to the case where the collection groove 3 is open in the vicinity of the outer edge 24.

"The duct 90 is open in the vicinity of an edge" is understood to mean that the duct 90 is open at one of its ends near the edge, in other words either through the sole plate 1 or directly on this edge.

In all cases, one of the ends of a duct 90 is open away from the friction face 26. A duct 90 therefore either leads to an edge (21, 22, 23, 24), or through the sole plate 1, or into another groove.

Figure 3:
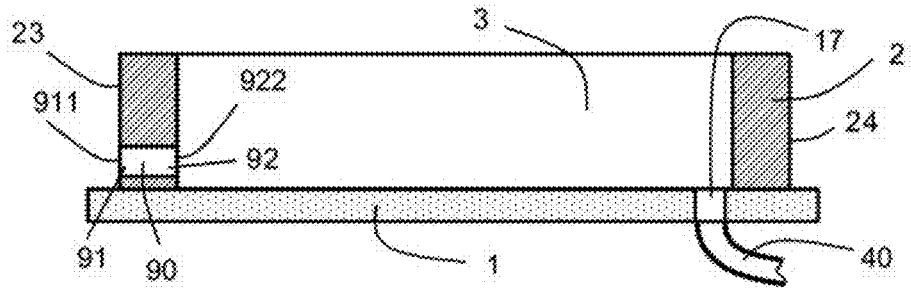
FIG. 3 is a sectional view along the collection groove of a brake pad according to the invention, along line III-III of FIG. 2.
Figure 4:
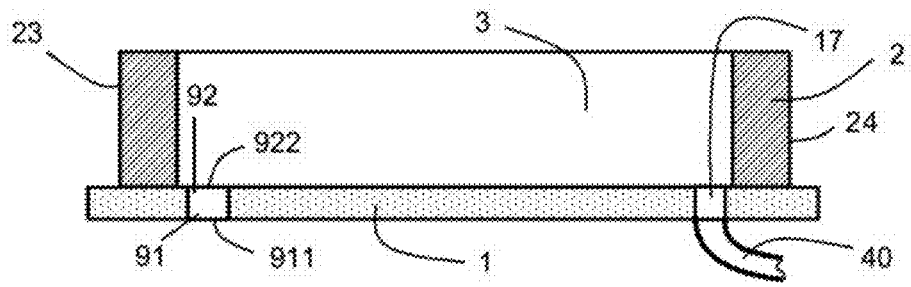
FIG. 4 is a sectional view along the collection groove according to another embodiment of the invention.

As illustrated in FIG. 1, and in FIGS. 2 to 4, the collection groove 3 is for example a single groove which runs along the rear edge 21, having a first end and a second end.

Near the outer edge 24, the groove 3 terminates at its second end in a blind end 31 which is not open to the outer edge 24.

At this blind end 31, the sole plate 1 comprises a suction through-hole 17 which leads into the groove 3. This suction hole 17 is visible in FIG. 3. The particles 28 sucked into the groove 3 thus travel into the suction hole 17 then into a pipe 40 which is part of the suction system. The pipe 40 is connected at one of its ends to the suction hole 17. These elements are visible in FIG. 3.

The pipe 40 is connected to a suction mechanism (not shown) which is part of the suction system, and which is able to suck the particles 28 from the groove 3 through the pipe 40.

The collection groove 3 is extended at its first end by a duct 90.

A duct 90 consists of a continuous side wall connecting two ends, and is only open at these two ends. The duct 90 thus forms a tunnel.

The outer end 91 of the duct 90 opens in the vicinity of the inner edge 23, via an inlet 911. The inner end 92 of the duct 90 opens into the collection groove 3, via an outlet 922. The outlet 922 forms a cross-sectional jump with the groove 3, meaning that the cross-sectional area increases sharply (stepwise) from the duct 90 to the groove 3.

This increase in cross-sectional area is visible in FIG. 3, which is a cross-section along line III-III of FIG. 2, in other words along the collection groove 3 and the duct 90, from the inner edge 23 to the outer edge 24.

Due to this sudden increase in cross-sectional area, during operation there is a negative pressure between the inlet 911 and the collection groove 3 on each side of the duct 90, in other words across the duct 90.

As illustrated in FIGS. 1 to 3, the duct 90 opens onto the inner edge 23 via its inlet 911.

Thus, during operation, air circulates from the inlet 911 through the duct 90 to the outlet 922, then in the groove 3 to the suction hole 17, then into the pipe 40, which allows the evacuation of particles and dust 28 present in the air. This circulation of the air is specific to the case illustrated in FIGS. 1 to 3. In general, the terms "inlet" and "outlet" are not necessarily related to the direction of air flow in the duct 90.

The duct 90 is of constant circular cross-section.

Alternatively, the duct 90 is of non-circular cross-section, and/or is of variable cross-section.

Advantageously, the opening of the inlet 911 is within the region of the inner edge 23 (or in the general case, one of the edges (21, 22, 23, 24) of the lining 2) which is closest to the sole plate 1 and which is not consumed by the end of the normal operating life (service life) of the pad 10.

Thus, throughout the life of the pad 10, the cross-sectional area of the duct 90 remains constant, and the performance in suctioning particles 28 via the collection groove is maintained.

This region of the lining 2 which is not consumed at the end of the service life of the pad 10 extends over a certain percentage of the height of the lining 2 measured from the sole plate 1.

For example, this percentage is equal to one third of the initial height (before wear) of the lining 2.

When a duct 90 is located at a height equal to this percentage of the initial height of the lining 2, the duct 90 acts as a visual wear indicator. In effect, when the wear of the lining 2 reaches the duct 90, this indicates that the service life of the pad 10 has been reached.

According to another embodiment, the duct 90 does not lead to the inner edge 23. On the contrary, the duct 90 passes through the sole plate 1 from the collection groove 3, such that the inlet 911 opens onto the second face 14 of the sole plate 1. The outlet 922 is located at the first face 13 of the sole plate 1. This embodiment is illustrated in FIG. 4. FIG. 4 is identical to FIG. 3, except for the position of the duct 90.

This solution offers the advantage that the duct 90 can be drilled in the sole plate 1 during the plate's manufacture, and it is not necessary to form the duct 90 in the lining 2. Manufacture of the plate 10 is therefore simplified, and its cost is reduced.

In addition, the cross-sectional area of the duct 90 remains constant throughout the service life of the pad 10, and the performance in suctioning particles 28 through the collection groove is maintained.

Regardless of the embodiment, the negative pressure that is created at the outlet 922 and collection groove 3, and the fact that the cross-sectional area of the duct 90 remains constant during most of the service life of the lining 2, make it possible to maintain a constant flow velocity in the collection groove 3, and therefore a constant suction flow rate. The performance in suctioning particles 28 through the collection groove is thus maintained as the lining 2 wears.

In the example illustrated in FIG. 1, the outer end 91 of the duct 90 is open in the vicinity of the inner edge 23, via an inlet 911.

More generally, in the case of a single collection groove 3, the outer end 91 of the duct 90 is open at least in the vicinity of one among the rear edge 21, the front edge 22, the inner edge 23, and the outer edge 24.

Figure 6:
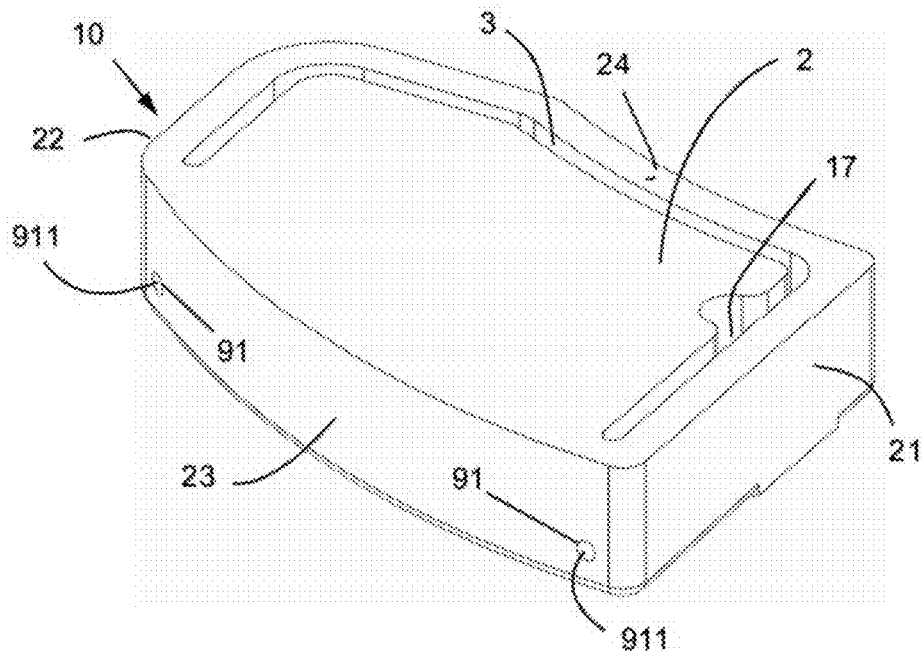
FIG. 6 is a perspective view of a brake pad according to another embodiment of the invention.

Another embodiment of the invention will now be described with reference to FIG. 6. FIG. 6 illustrates a brake pad in the railway sector.

The collection groove 3 is a single C-shaped groove which runs along the rear edge 21 and the front edge 22. The central portion of the collection groove 3 runs along the outer edge 24 and connects the front portion and rear portion of the collection groove 3.

The rear portion (which runs along the rear edge 21) of the collection groove 3 is extended at its first end by a duct 90 which is open in the vicinity of the inner edge 23.

The front portion (which runs along the front edge 22) of the collection groove 3 is extended at its second end by another duct 90 which is open in the vicinity of the inner edge 23.

Each of these ducts 90 is similar to the duct 90 described with reference to FIGS. 1 to 4.

Alternatively, each of these two ducts 90 has a different geometry, for example of different cross-sections so as to balance the flow rates.

The sole plate 1 has a suction through-hole 17 which leads into the rear portion of the groove 3, as illustrated in FIG. 6. The groove 3 is widened there (the groove 3 may also not be widened at this location).

Alternatively, the suction hole 17 leads into the front portion or into the central portion of the groove 3.

In all cases, the suction hole 17 is located at a distance from the ends of the collection groove 3.

Figure 7:
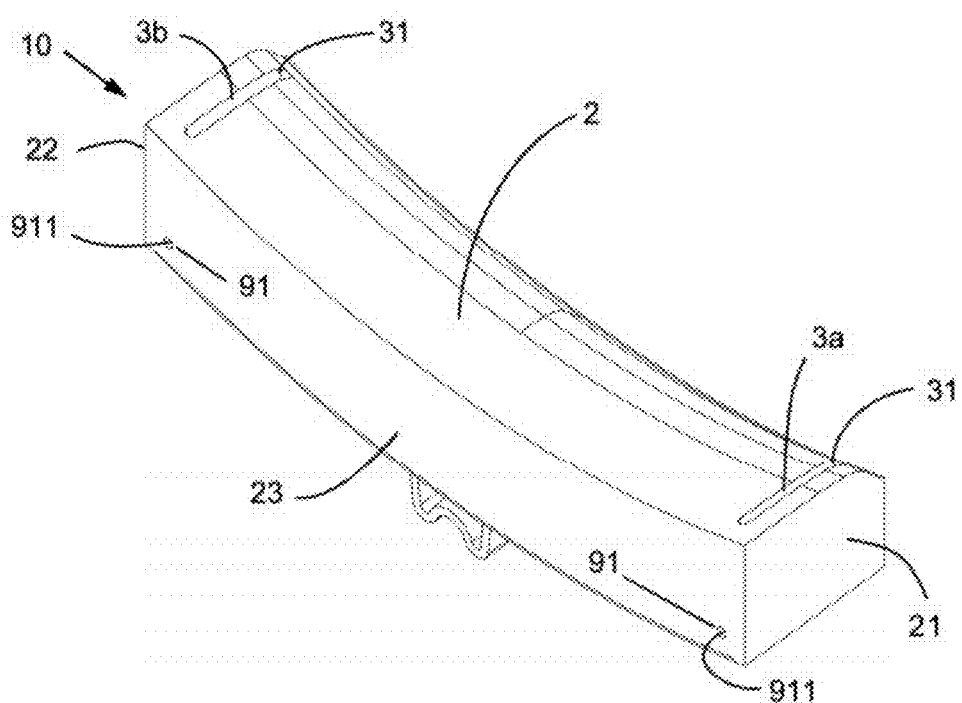
FIG. 7 is a perspective view of a brake pad according to yet another embodiment of the invention.

Another embodiment of the invention will now be described with reference to FIG. 7. FIG. 7 illustrates a brake pad in the railway sector.

The lining 2 has two separate grooves, namely a first groove 3a which runs along the rear edge 21, and a second groove 3b which runs along the front edge 22.

The first collection groove 3a is extended at its first end by a first duct 90 which is open in the vicinity of the inner edge 23.

The second collection groove 3b is extended at its first end by a second duct 90 which is open in the vicinity of the inner edge 23.

Each of these ducts 90 is similar to the duct 90 described with reference to FIGS. 1 to 4.

Alternatively, each of these two ducts 90 has a different geometry.

The first groove 3a terminates at its second end in a blind end 31, which does not open onto the outer edge 24.

The second groove 3b terminates at its second end in a blind end 31, which does not open onto the outer edge 24.

In the case of the first groove 3a and of the second groove 3b, the sole plate 1 comprises, at this blind end 31, a suction through-hole 17 (not visible) which leads into each of these grooves.

Thus, each among the first groove 3a and second groove 3b is similar to the single groove 3 described in FIGS. 1 to 4.

In the embodiment of FIG. 6 and in the embodiment of FIG. 7, each of the suction holes 17 is connected to one end of a pipe 40 which is part of the suction system, so that the particles 28 are able to be sucked in by these suction holes 17. The embodiments of FIGS. 6 and 7, examples where the lining 2 has one or more collection grooves 3 near the rear edge 21 as well as near the front edge 22, make it possible to optimize the collection of particles in both directions of movement of the vehicle (two directions of rotation of the rotary member 9, relative to the lining 2).

Another embodiment of the invention will now be described with reference to FIG. 8.

Figure 8:
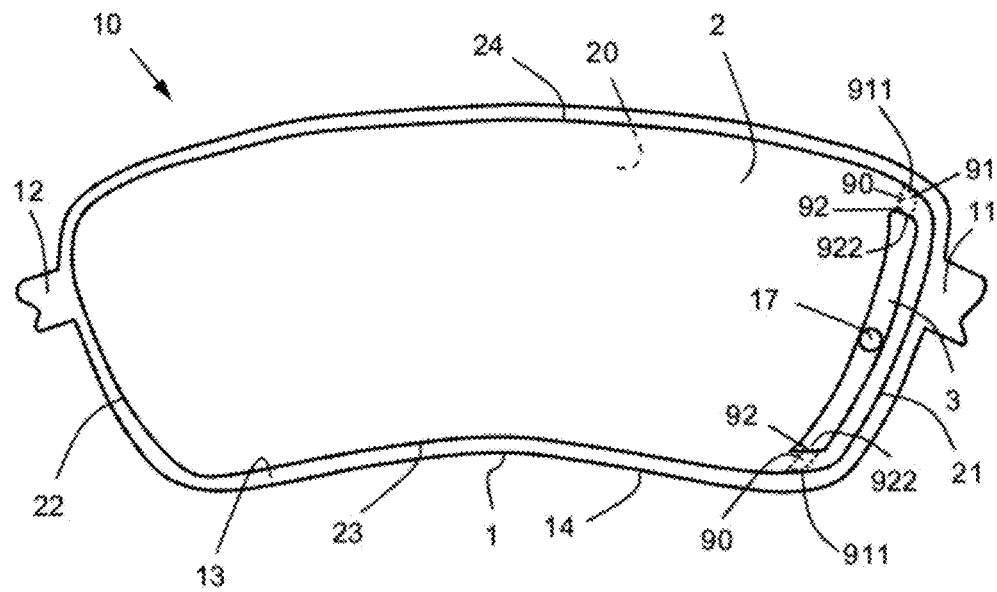
FIG. 8 is a top view of a brake pad according to yet another embodiment of the invention.

The brake pad illustrated in FIG. 8 is a modification of the brake pad illustrated in FIG. 1. Other than the differences described below, these two pads are identical.

In the pad in FIG. 8, the collection groove 3 is extended at its first end, in the vicinity of the inner edge 23, by a duct 90, and in addition is extended at its second end, in the vicinity of the outer edge 24, by another duct 90.

The duct 90 opens at its outer end 91, in the vicinity of the outer edge 24, via an inlet 911. The duct 90 opens at its inner end 92 into the collection groove 3, via an outlet 922. The outlet 922 forms a cross-sectional jump with the groove 3.

The sole plate 1 has a suction through-hole 17 which leads into the collection groove 3, as illustrated in FIG. 8.

The suction hole 17 is located at a distance from the ends of the collection groove 3, for example in the middle of the collection groove 3 as illustrated in FIG. 8. The two ducts may have different cross-sections depending on the position of the suction hole 17.

Thus, during operation, the air circulates from the inlets 911, through the two ducts 90 located at the first end and second end of the groove 3, then in the groove 3 to the suction hole 17, then in the pipe 40, which allows evacuation of the particles and dust 28 present in the air.

Another embodiment of the invention will now be described with reference to FIG. 9.

Figure 9:
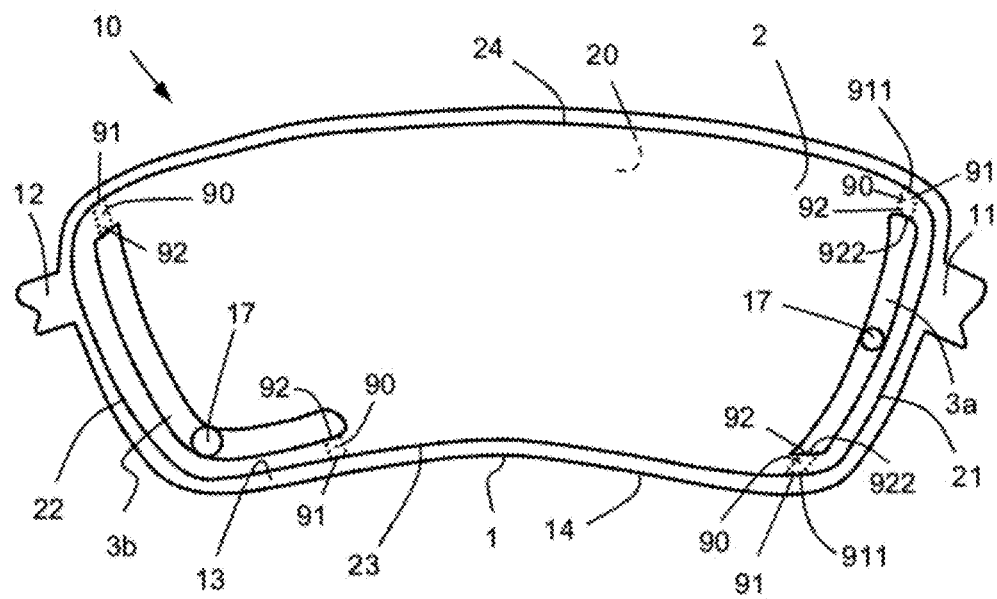
FIG. 9 is a top view of a brake pad according to yet another embodiment of the invention.

The brake pad shown in FIG. 9 is a modification of the brake pad shown in FIG. 8. Other than the differences described below, these two pads are identical.

The groove 3 illustrated in FIG. 9 comprises a first groove 3a identical to the groove illustrated in FIG. 8 and already described. The groove 3 further comprises a second groove 3b which runs along the front edge 22 in a first portion and along the inner edge 23 in a second portion, these two portions being connected by an elbow. The elbow is therefore located at the intersection of the front edge 22 and inner edge 23.

The first portion of the second groove 3b terminates in a first end which is located in the vicinity of the outer edge 24. The first portion is extended at this first end by a duct 90. The duct 90 is open at its outer end 91, in the vicinity of the outer edge 24, via an inlet 911 (for legibility of the figure, this reference is omitted here).

The duct 90 is open at its inner end 92, in this first portion of the second groove 3b, via an outlet 922 (for legibility of the figure, this reference is omitted here). The outlet 922 forms a cross-sectional jump with the second groove 3b.

The second portion of the second groove 3b terminates in a second end which is located in the vicinity of the inner edge 23. The first portion is extended at this second end by a duct 90. The duct 90 is open at its outer end 91, in the vicinity of the inner edge 23, via an inlet 911 (for legibility of the figure, this reference is omitted here).

The duct 90 is open at its inner end 92, in this second portion of the second groove 3b, via an outlet 922. The outlet 922 forms a cross-sectional jump with the second groove 3b.

The sole plate 1 comprises a suction through-hole 17 which leads into the first groove 3a, as described with reference to FIG. 8. The sole plate 1 comprises another suction through-hole 17 which leads into the second groove 3b at the elbow of this second groove 3b.

In all of the embodiments above and below, when the duct 90 is open at its outer end 91 via an inlet 911 which is in the vicinity of the outer edge 24 or inner edge 23 and which is close to the rear edge 21 or front edge 22, the duct 90 may, alternatively, be open at its outer end 91 via an inlet 911 which is located at the intersection of the outer edge 24 or inner edge 23 and the rear edge 21 or front edge 22.

The duct 90 may, alternatively, pass through the sole plate 1 to be open at its outer end 91 via an inlet 911 which opens onto the second face 14 of the sole plate 1.

Described above and illustrated in FIGS. 7 and 9 are the cases of a plurality of separate collection grooves 3 which are each extended, at at least one of their ends, by a duct 90 which is open in the vicinity of one of the edges (21, 22, 23, 24) of the lining 2.

Additionally or alternatively, the lining 2 is provided with a plurality of separate collection grooves 3, and at least one of the ducts 90 extends between an end of one of the grooves 3 and an end of another of the grooves 3.

Thus, in the case of a plurality of collection grooves 3, the following configurations are possible:

(a) at least one duct 90 is open at its inner end 92 in an end of a groove 3 and is open at its outer end 91 in the vicinity of one of the edges (21, 22, 23, 24) of the lining 2;

(b) at least one duct 90 is open at its inner end 92 in an end of a groove 3 and is open at its outer end 91 in an end of another groove 3;

(c) at least one duct 90 is open at its inner end 92 in an end of a groove 3 and is open at its outer end 91 in the vicinity of one of the edges (21, 22, 23, 24) of the lining 2, and at least one other duct 90 is open at its inner end 92 in an end of a groove 3 and is open at its outer end 91 in an end of another groove 3.

In the case of a single collection groove 3, it is configuration (a) that exists, with either a single duct 90 which is open in one end of the groove 3, or two ducts 90 which each are open in one of the two ends of the groove 3.

FIGS. 7 and 9 each illustrate an example of configuration (a) in the case of two grooves 3.

Figure 10:
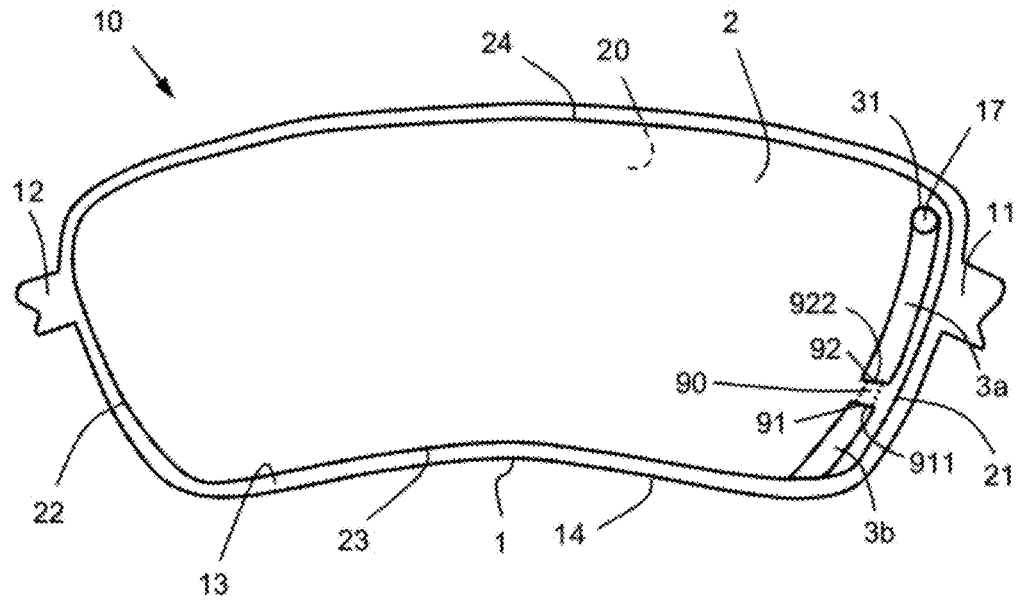
FIG. 10 is a top view of a brake pad according to yet another embodiment of the invention.

FIG. 10, described below, illustrates an example of configuration (b) in the case where the lining 2 is provided with only two separate collection grooves 3, namely a first groove 3a and a second groove 3b. The first groove 3a and the second groove 3b are extensions of one another and extend along the rear edge 21. A single duct 90 extends between a first end of the first groove 3a and a first end of the second groove 3b.

Thus, the duct 90 is open at its outer end 91 in collection groove 3b, via an inlet 911. The inlet 911 forms a cross-sectional jump with groove 3b. The duct 90 is open at its inner end 92 in collection groove 3a, via an outlet 922. The outlet 922 forms a cross-sectional jump with groove 3a.

The second end of the first groove 3a is a blind end 31, which is not open on the outer edge 24.

At this blind end 31, the sole plate 1 has a suction through-hole 17 which leads into the groove 3.

The second end of the second groove 3b is open on the inner edge 23.

Figure 11:
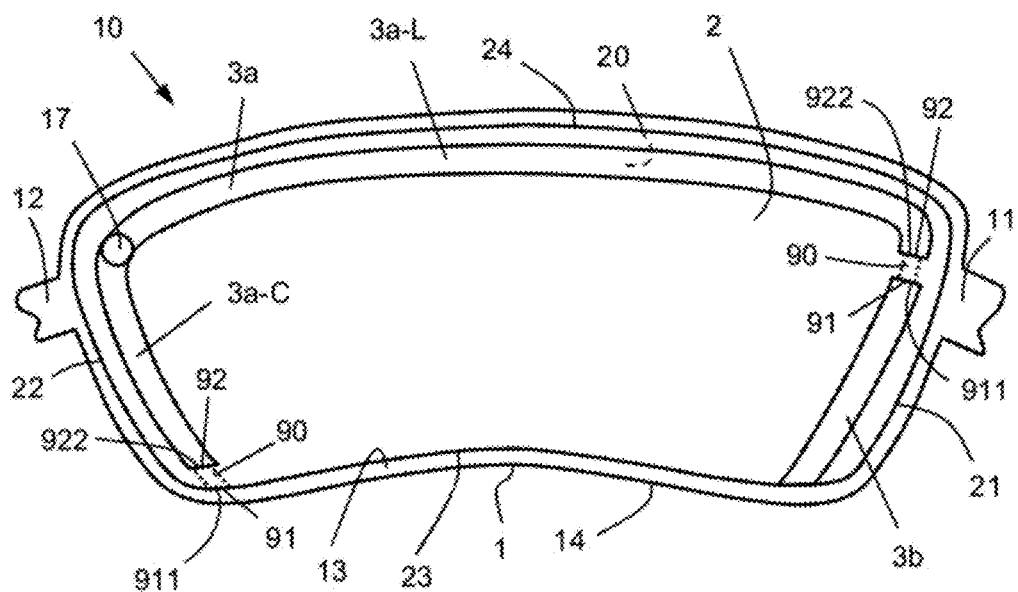
FIG. 11 is a top view of a brake pad according to yet another embodiment of the invention, FIG. 12, already described, shows a pad according to the prior art in a top view, FIG. 13, already described, shows a pad according to the prior art in a perspective view.
Figure 12:
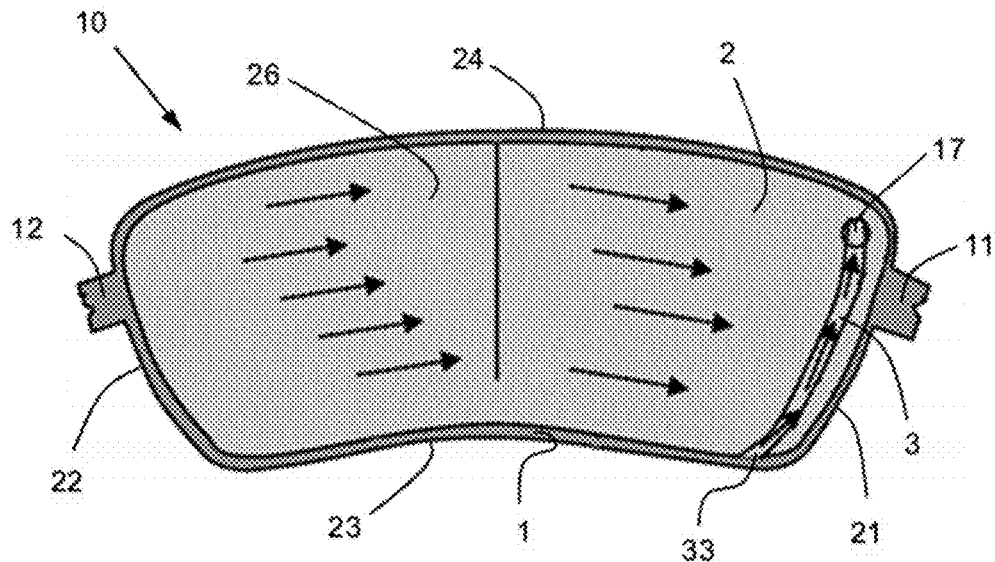
Figure 13:
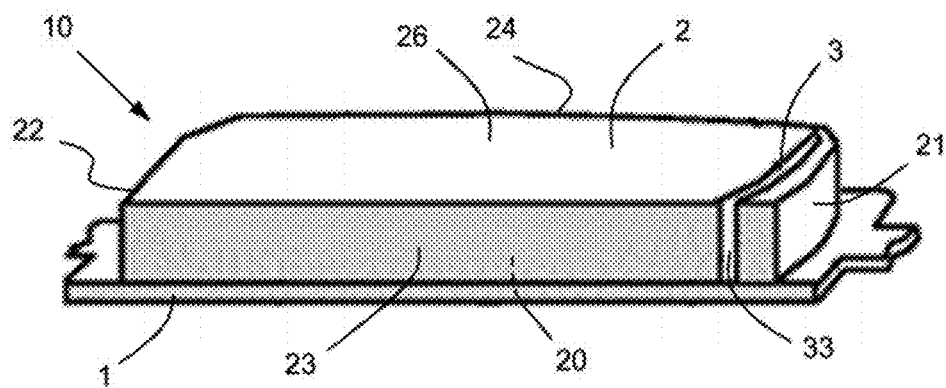

FIG. 11, described below, illustrates an example of configuration (c) in the case where the lining 2 is provided with only two separate collection grooves 3, namely a first groove 3a and a second groove 3b.

The first groove 3a is L-shaped, and has a short portion 3a-C which runs along the front edge 22, and a long portion 3a-L which runs along the outer edge 24.

The short portion 3a-C extends from the corner of the front edge 22 and outer edge 24 to near the inner edge 23 where it terminates in an end. The short portion 3a-C is extended at this end by a duct 90. The duct 90 is open at its outer end 91 in the vicinity of the inner edge 23, via an inlet 911, and is open at its inner end 92 in the first groove 3a, via an outlet 922.

The long portion 3a-L extends from the short portion 3a-C, to which it is connected by an elbow. This elbow is therefore located at the intersection of the front edge 22 and outer edge 24.

The sole plate 1 has a suction through-hole 17 which leads into the first groove 3a at the elbow of this first groove 3a.

The long portion 3a-L extends to the corner of the rear edge 21 and outer edge 24 where it curves towards the rear edge 21 until an end. This end is located facing an end of the second groove 3b.

The second groove 3b extends along the rear edge 21 from this end facing the end of the long portion 3a-L of the first groove 3a, to another end which is open on the inner edge 23.

A duct 90 extends between the end of the first groove 3a and the end of the second groove 3b, which face one another.

Thus, the duct 90 is open at its outer end 91 in the second groove 3b, via an inlet 911. The inlet 911 forms a cross-sectional jump with the second groove 3b. The duct 90 is open at its inner end 92 in collection groove 3a, via an outlet 922. The outlet 922 forms a cross-sectional jump with groove 3a.

Other configurations of grooves 3 are possible, for example a single groove 3 which extends along almost the entire circumference of the lining 2, or a plurality of grooves 3 which are disjoint and communicate with each other via at least one duct 90 and which together extend along almost the entire circumference of the lining 2.

The invention claimed is:

1. A brake pad (10), the pad comprising a sole plate (1) with an outer face (14) and an inner face (13), and a lining (2) made of friction material fixed to said inner face (13), the lining being delimited by a friction face (26), an attachment face (20), an inner edge (23), an outer edge (24), a rear edge (21), and a front edge (22), the lining being provided with at least one collection groove (3) that is open on the friction face (26) and is located at least in part near the rear edge (21), the sole plate comprising at least one suction hole (17) in fluid communication with said at least one collection groove (3), said at least one suction hole (17) being connected to a negative pressure source via communication means, said at least one collection groove (3) being extended, at at least one end of the collection groove, by a duct (90) of which the outer end (91) is open away from said friction face (26), via an inlet (911), and of which the inner end (92) is open in said at least one collection groove (3) via an outlet (922) which forms a cross-sectional jump with said at least one groove (3) such that, during operation, a negative pressure exists between said inlet of the duct (911) and said at least one collection groove (3) one on each side of said duct (90), said outer end (91) being open in the region of one of said edges (21, 22, 23, 24) which is closest to said sole plate (1) and which is not consumed at the end of the normal operating life of said pad (10).

2. The brake pad (10) according to claim 1, wherein said at least one collection groove (3) consists of a single groove which runs along said rear edge (21).

3. The brake pad (10) according to claim 2, wherein said at least one collection groove (3) also runs along said front edge (22).

4. The brake pad (10) according to claim 3, wherein said collection groove (3) is C-shaped or E-shaped and runs along said outer edge (24) or said inner edge (23).

5. The brake pad (10) according to claim 1, wherein said at least one collection groove (3) consists of a plurality of separate grooves including a first groove (3a) which runs along said rear edge (21).

6. The brake pad (10) according to claim 5, wherein said plurality of grooves is two in number.

7. The brake pad (10) according to claim 6, wherein said duct (90) extends between one end of one groove and one end of another groove among the plurality of grooves.

8. The brake pad (10) according to claim 5, wherein said duct (90) extends between one end of one groove and one end of another groove among the plurality of grooves.

* * * * *